United States Patent
Iwabuchi et al.

(10) Patent No.: US 7,230,261 B2
(45) Date of Patent: Jun. 12, 2007

(54) RADIATION IMAGE STORAGE PANEL

(75) Inventors: Yasuo Iwabuchi, Kanagawa (JP); Yuichi Hosoi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 238 days.

(21) Appl. No.: 10/927,011

(22) Filed: Aug. 27, 2004

(65) Prior Publication Data

US 2005/0051746 A1   Mar. 10, 2005

(30) Foreign Application Priority Data

Aug. 27, 2003   (JP) ............................. 2003-303466

(51) Int. Cl.
*G03B 42/08* (2006.01)
*G21K 4/00* (2006.01)

(52) U.S. Cl. .................... 250/581; 250/584; 250/484.4

(58) Field of Classification Search ............... 250/580, 250/581, 584, 586, 484.4
See application file for complete search history.

(56) References Cited

U.S. PATENT DOCUMENTS

| 6,329,662 B1 * | 12/2001 | Yamane et al. .......... 250/483.1 |
| 6,507,040 B2 | 1/2003 | Isoda |
| 6,992,305 B2 * | 1/2006 | Maezawa et al. ........ 250/484.4 |
| 2006/0076883 A1 * | 4/2006 | Himaki et al. .............. 313/503 |

FOREIGN PATENT DOCUMENTS

JP   63191885 A   *   8/1988

OTHER PUBLICATIONS

P. Leblans, "New Needle-crystalline detector for X-ray computer radiography (CR)," NDT.net, vol. 7, No. 12, Dec. 2002, pp. 1-10, XP-002307796.

* cited by examiner

*Primary Examiner*—Albert Gagliardi
(74) *Attorney, Agent, or Firm*—Sughrue Mion, PLLC (57) ABSTRACT

In a radiation image storage panel having an energy storable phosphor layer formed by a gas phase-accumulation method, the energy storable phosphor layer gives off an emission having a luminescence width in terms of d in the range of 150 to 395 μm when it is exposed to radiation and then excited with a stimulating light of 50 μm half-width.

9 Claims, 5 Drawing Sheets

RADIATION IMAGE STORAGE PANEL

FIELD OF THE INVENTION

The present invention relates to a radiation image storage panel employable in a radiation image recording and reproducing method utilizing an energy storable phosphor. The invention also relates to a process for reading a radiation image information recorded and stored in the radiation image storage panel.

BACKGROUND OF THE INVENTION

When the energy storable phosphor (e.g., stimulable phosphor, which gives off stimulated emission) is exposed to radiation such as X-rays, it absorbs and stores a portion of the radiation energy. The phosphor then emits stimulated emission according to the level of the stored energy when exposed to electromagnetic wave such as visible or infrared light (i.e., stimulating light). A radiation image recording and reproducing method utilizing the energy storable phosphor has been widely employed in practice. In that method, a radiation image storage panel, which is a sheet comprising the energy storable phosphor, is used. The method comprises the steps of: exposing the storage panel to radiation having passed through an object or having radiated from an object, so that radiation image of the object is temporarily recorded in the storage panel; sequentially scanning the storage panel with a stimulating light such as a laser beam to emit a stimulated light; and photoelectrically detecting the emitted light to obtain electric image signals. The storage panel thus processed is then subjected to a step for erasing radiation energy remaining therein, and then stored for the use in the next recording and reproducing procedure. Thus, the radiation image storage panel can be repeatedly used.

The radiation image storage panel (often referred to as energy storable phosphor sheet) used in the radiation image recording and reproducing method has a basic structure comprising a support and a phosphor layer provided thereon. However, if the phosphor layer is self-supporting, the support may be omitted. Further, a protective layer is generally provided on the free surface (surface not facing the support) of the phosphor layer to keep the phosphor layer from chemical deterioration or physical shock.

Various kinds of phosphor layer are known and used. For example, a phosphor layer comprising a binder and an energy storable phosphor dispersed therein is generally used, and a phosphor layer comprising agglomerate of an energy storable phosphor without binder is also known. The latter layer can be formed by a gas phase-accumulation method or by a firing method. Further, still also known is a phosphor layer comprising energy storable phosphor agglomerate impregnated with a polymer material.

Japanese Patent Provisional Publication 2001-255610 discloses a variation of the radiation image recording and reproducing method. While an energy storable phosphor of the storage panel used in the conventional type plays both roles of radiation-absorbing function and energy storable function, those two functions are separated in the disclosed method. In the method, a radiation image storage panel comprising at least an energy storable phosphor (which stores radiation energy) is used in combination with a phosphor screen comprising another phosphor (radiation-absorbing phosphor) which absorbs radiation and emits ultraviolet or visible light. The disclosed method comprises the steps of: causing the radiation-absorbing phosphor of the screen or the panel to absorb and convert radiation having passed through an object or having radiated from an object into ultraviolet or visible light; causing the energy storable phosphor of the panel to store the energy of the converted light as radiation image information; sequentially scanning the panel with a stimulating light to emit stimulated light; and photoelectrically detecting the emitted light to obtain electric image signals.

The radiation image recording and reproducing method (or radiation image forming method) has various advantages as described above. However, it is still desired that the radiation image storage panel used in the method have as high sensitivity as possible and, at the same time, give a reproduced radiation image of high quality (in regard to sharpness and graininess).

In order to improve the sensitivity and the image quality, it is proposed that the phosphor layer of the storage panel be prepared by a gas phase-accumulation method such as vacuum vapor deposition, sputtering or chemical vapor deposition (CVD). The process of vacuum vapor deposition, for example, comprises the steps of: heating to vaporize an evaporation source comprising a phosphor or materials thereof by means of a resistance heater or an electron beam, and depositing and accumulating the vapor on a substrate such as a metal sheet to form a layer of the phosphor in the form of columnar crystals.

The phosphor layer formed by the gas phase-accumulation method contains no binder and consists of the phosphor only, and there are cracks among the columnar crystals of the phosphor. Because of the cracks, the stimulating light can stimulate the phosphor efficiently and the emitted light can be collected efficiently, too. Accordingly, a radiation image storage panel having that phosphor layer has high sensitivity. At the same time, since the cracks prevent the stimulating light from diffusing parallel to the phosphor layer, the storage panel can give a reproduced image of high sharpness.

As a process for reading out radiation image information from the storage panel, a line-scanning reading method is proposed so as to shorten the time of read-out, to downsize the apparatus and to reduce the cost. Japanese Patent Provisional Publication 2001-350230 discloses a radiation image information-reading apparatus for the line-scanning reading method. The disclosed apparatus comprises a line light source which irradiates the storage panel linearly with stimulating lights to cause stimulated emission, a stimulated emission-detecting means which receives and photoelectrically converts the stimulated emission given off by the panel from the area linearly exposed to the stimulating lights, a scanning means by which the storage panel and a combination of the light source and the detecting means are relatively moved in a direction (secondary direction of scanning) different from the longitudinal direction of the linearly exposed area (primary direction of scanning), and a reading means by which signals output from the detecting means are read in accordance with the movement. The detecting means comprises a linear light-receiving face whose width in the direction perpendicular to the longitudinal direction (that is, generally, a dimension of the face in the secondary direction of scanning) is designed so that 30 to 90% of the stimulated emission can be detected even though the emission is spread or diffused. Japanese Patent Provisional Publication 2001-350230 also discloses a graph showing a relationship between the diffusion of stimulated emission and the distribution of diffused emission intensity. The graph indicates that the storage panel processed in the above apparatus gives a stimulated emission of about 400 µm luminescence width (full width at half maximum, i.e., half-width).

SUMMARY OF THE INVENTION

An object of the present invention is to provide a radiation image storage panel improved in sensitivity and in sharpness.

Another object of the invention is to provide a process for reading radiation image information from an radiation image-stored storage panel, whereby a radiation image of high quality can be obtained.

The present inventors have studied a radiation image storage panel comprising a phosphor layer formed by the gas phase-accumulation method, and have finally found that, if the storage panel gives off stimulated emission of a specific luminescence width, both sensitivity and sharpness can be improved when the emission is observed with a line-scanning detecting means comprising pixels whose sizes are designed for medical diagnoses. It is also found that, if the pixel of the detecting means has a specific size in the primary direction of scanning, a radiation image of high quality can be obtained.

The present invention resides in a radiation image storage panel comprising an energy storable phosphor layer formed by a gas phase-accumulation method, wherein the energy storable phosphor layer gives off an emission having a luminescence width in terms of d in the range of 150 to 395 µm (preferably 150 to 380 µm, more preferably 290 to 380 µm) when it is exposed to radiation and then excited with a stimulating light of 50 µm half-width.

In the specification, the term "luminescence width in terms of d" means a half-width (i.e., full width at half maximum) in an emission profile obtained by the steps of: applying a stimulating light of about 50 µm half-width onto a radiation image storage panel having been exposed to X-rays in the manner that the stimulating light impinges at an angle of about 15° to the normal of the panel surface, to make the storage panel give off emission; focusing the emission with a SELFOC lens array placed perpendicularly to the normal of the storage panel; leading the emission through an optical filter which cuts the stimulating light but which transmits the emission; and detecting the emission by means of a two-dimensional CCD sensor array comprising about 800×800 pixels having a size of about 7 µm.

The invention also resides a process for reading out a radiation image stored in a radiation image storage panel which comprises the steps of:

moving a radiation image storage panel of the invention in which the radiation image is stored, relatively to a set of a stimulating means and a light-detecting means in which the stimulating means applies to one surface of the storage panel a stimulating light extended linearly in a width direction of the storage panel and in which the light-detecting means is equipped with an isometric erect image-forming means and comprises a plurality of photoelectrically converting pixels aligned in the width direction of the storage panel, each of the pixels having a size in terms of D under such conditions that 25 µm≦D≦400 µm and 0.5≦d/D≦4 in the width direction of the storage panel;

applying the stimulating light to one surface of the storage panel linearly in the width direction of the storage panel and detecting a stimulated emission given off by the storage panel by the light-detecting means through the equivalent erect image-forming means to produce a series of electric signals; and processing the electric signals in relation to an information of the relative movement between the storage panel and the set of a stimulating means and a light-detecting means, to obtain a reproduced radiation image in the form of a series of electric image signals.

The radiation image storage panel of the invention, which gives off stimulated emission having a luminescence width in a specific range, has high sensitivity and gives a radiation image of high sharpness, and hence is balanced and suitable for medical diagnoses. Further, the process of the invention for read-out of radiation image information, in which the detecting means comprises pixels of a size in a specific range, gives a radiation image of high sharpness with high sensitivity.

DETAILED DESCRIPTION OF THE INVENTION

The energy storable phosphor used in the radiation image storage panel of the invention preferably is a stimulable alkali metal halide phosphor represented by the following formula (I). In the formula (I), it is preferred that $M^I$ is Cs, X is Br, A is Eu, and z is a number satisfying the condition of $1 \times 10^{-4} \leq z \leq 0.1$.

$$M^I X \cdot aM^{II}X'_2 \cdot bM^{III}X''_3 : zA \qquad (I)$$

[in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Cu, Ag, Tl and Bi; and a, b and z are numbers satisfying the conditions of $0 \leq a < 0.5$, $0 \leq b < 0.5$ and $0 < z < 1.0$, respectively].

In the process of the invention for read-out of radiation image information, the light-detecting means preferably is a line sensor which comprises plural photoelectric converting elements arranged linearly. Each pixel of the light-detecting means preferably one-to-one corresponds to each photoelectric converting element.

In the following description, the radiation image storage panel of the invention is explained in detail with reference to the attached drawings.

The radiation image storage panel of the invention comprises an energy storable phosphor layer formed by a gas phase-accumulation method, and gives off stimulated emission having a luminescence width (d) of 150 to 380 μm. The luminescence width d (half-width, i.e., full width at half maximum) can be determined on the basis of an emission profile, as shown in FIG. 1.

Figure 1:
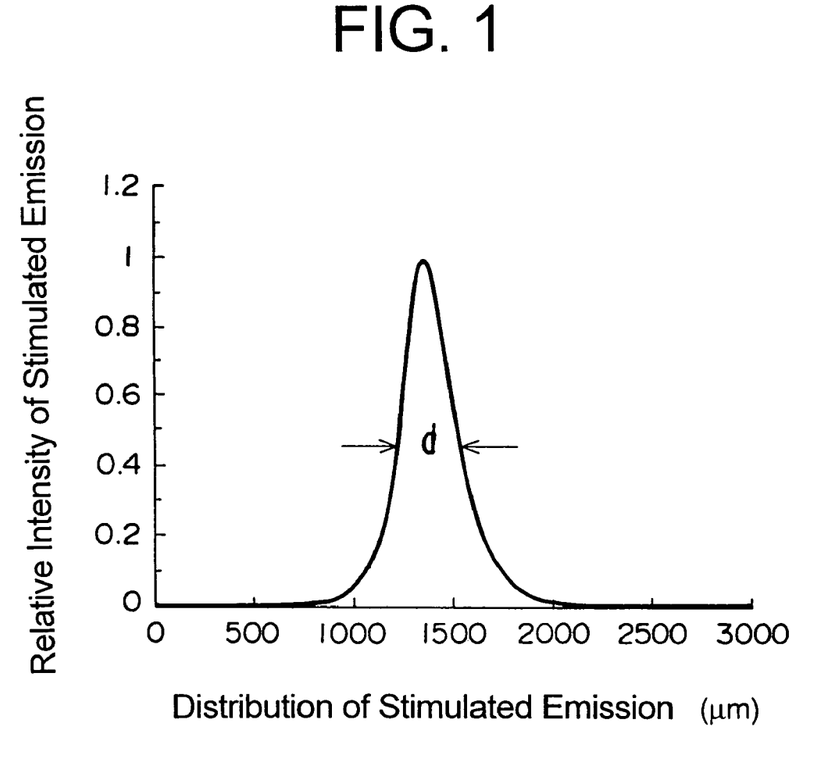
FIG. 1 is a graph showing the emission profile given by a radiation image storage panel of the invention.
Figure 2:
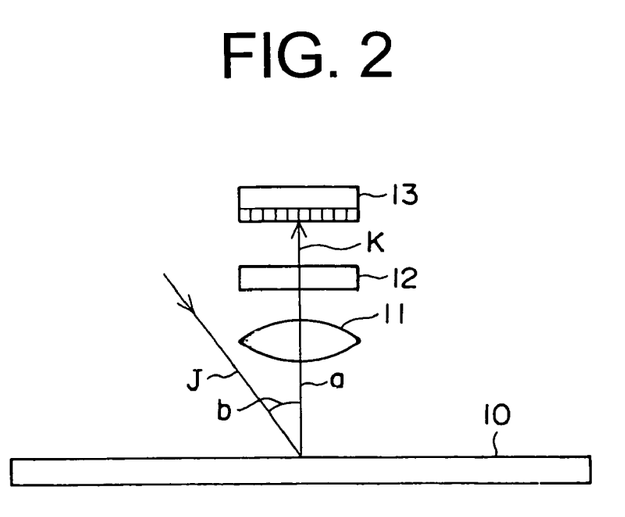
FIG. 2 illustrates a sketch showing a light-detecting means with which the stimulated emission is detected to determine the luminescence width.

FIG. 1 is a graph showing a relationship between distribution and intensity of stimulated emission, namely, an emission profile. The emission profile of FIG. 1 is obtained in the following manner. First, a storage panel comprising a support and a CsBr:Eu stimulable phosphor layer formed by vapor deposition is exposed to X-rays (tube voltage: 80 kVp, amount: 100 mR), and then excited with a semiconductor laser beam (wavelength: 660 nm). Before applied onto the storage panel, the laser beam was focused though a lens so that the half-width would be set to 50 μm. As shown in FIG. 2, the focused beam (J) is applied onto the top surface (phosphor layer-side surface) of the storage panel 10 so that the beam would is impinged at an angle (b) of about 15° to the normal (a), to cause the storage panel 10 to give off emission (K). The emission (K) is focused with a SELFOC lens array 11 placed perpendicularly to the normal (a), that is, parallel to the storage panel 10; led through an optical filter 12 [B410, HOYA Corporation] which cuts the stimulating light but which transmits the emission; and detects by means of a two-dimensional CCD sensor array 13 comprising about 800×800 pixels (size: about 7 μm), to obtain the emission profile.

If the luminescence width (d, half-width, i.e., full width at half maximum) is in the range of 150 to 395 μm (particularly, 150 to 380 μm, more particularly 290 to 380 μm), the radiation image storage panel of the invention is excellent in both sensitivity and sharpness.

Figure 3:
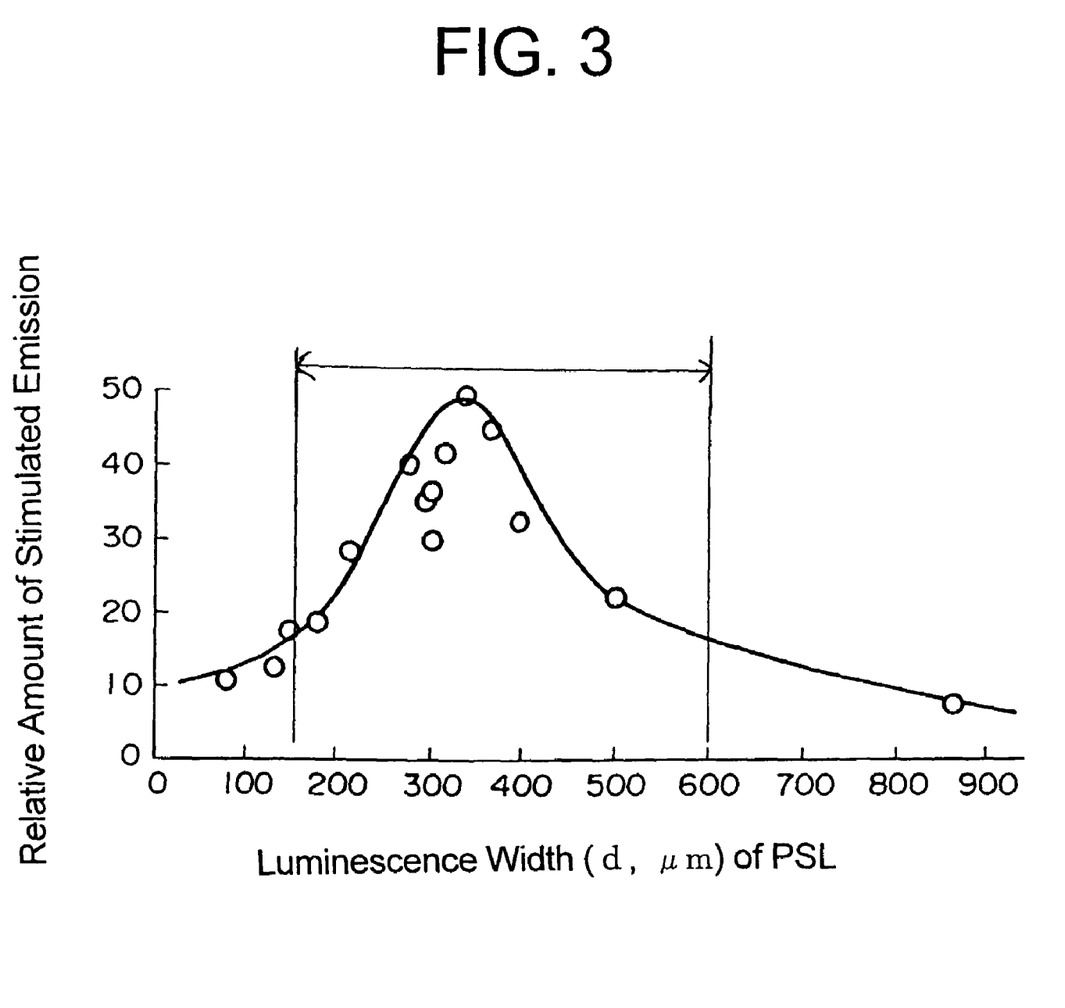
FIG. 3 is a graph showing a relationship between the luminescence width (d) and the amount of stimulated emission given off by a radiation image storage panel.

FIG. 3 is a graph showing a relationship between the luminescence width (d) and the amount of stimulated emission (relative value). Various radiation image storage panels having vapor-deposited CsBr:Eu phosphor layers were produced (in Examples described later), and the stimulated emission given off by each storage panel was determined using a detecting means having the pixel size of 200 μm, which is generally required for medical diagnoses, to obtain the relationship. The graph of FIG. 3 indicates that the amount of stimulated emission, which corresponds to sensitivity, is highest when the luminescence width (d) is within the range of 150 to 600 μm.

Figure 4:
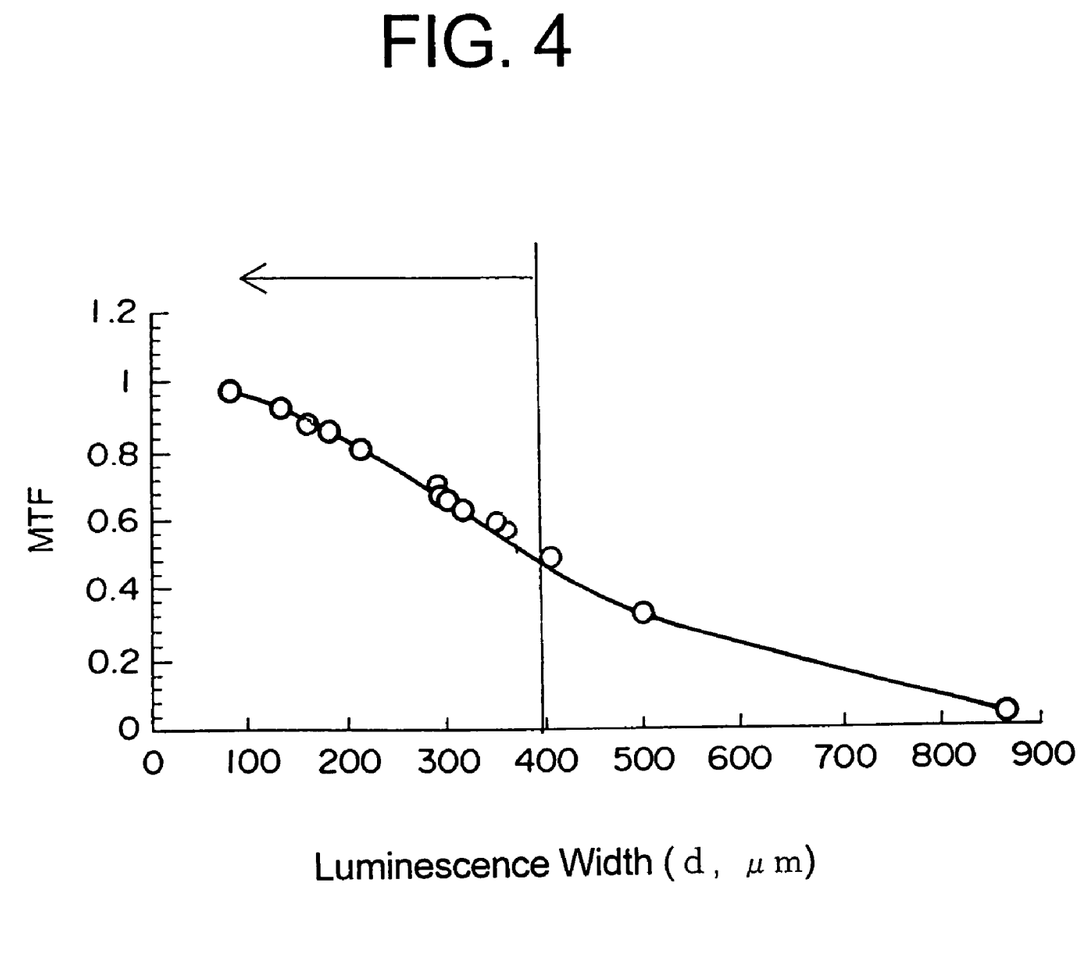
FIG. 4 is a graph showing a relation between the luminescence width (d) and the modulation transfer function (MTF) of radiation image.

FIG. 4 is a graph showing a relation between the luminescence width (d) and the modulation transfer function (MTF) of radiation image. The graph of FIG. 4 was also obtained from the above storage panels (Examples) using the detecting means having the pixel size of 200 μm. It is clearly shown in FIG. 4 that high MTF, which corresponds to high sharpness, can be obtained when the luminescence width (d) is 395 μm or shorter (particularly, 380 μm or shorter).

In the following description, the process for preparation of the radiation image storage panel of the invention is explained in detail, by way of example, utilizing a case where a resistance-heating process is used in the gas phase-accumulation method. The resistance-heating process can be carried out under medium vacuum, and thereby a favorable columnar crystal-deposited layer can be easily formed.

The substrate on which the vapor is to be deposited can be as such used as a support of the radiation image storage panel, and hence can be optionally selected from known materials conventionally used as a support of a radiation image storage panel. The substrate preferably is a sheet of quartz glass, sapphire glass; metal such as aluminum, iron, tin or chromium; or heat-resistant resin such as aramide. Particularly preferred are an aluminum plate and quartz glass. For improving the sensitivity or the image quality (e.g., sharpness and graininess), a conventional radiation image storage panel often has a light-reflecting layer containing a light-reflecting material such as titanium dioxide or a light-absorbing layer containing a light-absorbing material such as carbon black. These auxiliary layers can be provided on the radiation image storage panel of the invention. Further, in order to accelerate growth of the columnar crystals, a great number of very small convexes or concaves may be provided on the substrate surface on which the vapor is deposited. If an auxiliary layer such as a subbing layer (e.g., adhesive layer), a light-reflecting layer or a light-absorbing layer is formed on the deposited-side surface of the substrate, the convexes or concaves may be provided on the surface of the auxiliary layer.

The energy storable phosphor preferably is a stimulable phosphor giving off stimulated emission in the wavelength region of 300 to 500 nm when exposed to a stimulating light in the wavelength region of 400 to 900 nm.

The phosphor is particularly preferably an alkali metal halide stimulable phosphor represented by the following formula (I):

$$M^I X \cdot aM^{II} X'_2 \cdot bM^{III} X''_3 : zA \qquad (I)$$

In the formula (I), $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Cu, Ag, Tl and Bi; and a, b and z are numbers satisfying the conditions of $0 \leq a < 0.5$, $0 \leq b < 0.5$ and $0 < z < 1.0$, respectively.

In the formula (I), z preferably is a number satisfying the condition of $1 \times 10^{-4} \leq z \leq 0.1$; $M^I$ preferably comprises at least Cs; X preferably comprises at least Br; and A preferably is Eu or Bi, more preferably Eu. The phosphor represented by the formula (I) may further contain metal oxides such as aluminum oxide, silicone dioxide and zirconium oxide as additives in an amount of 0.5 mol or less based on one mol of $M^I X$.

As the phosphor, it is also preferred to use a rare earth activated alkaline earth metal fluoride halide stimulable phosphor represented by the following formula (II):

$$M^{II} FX : aLn \qquad (II)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (II), $M^{II}$ preferably comprises Ba more than half of the total amount of $M^{II}$, and Ln preferably is Eu or Ce. The $M^{II}$FX in the formula (II) forms a matrix crystal structure of BaFX type, and it by no means indicates stoichiometrical composition of the phosphor. Accordingly, the molar ratio of F:X is not always 1:1. It is generally preferred that the BaFX type crystal have many $F^+(X^-)$ centers corresponding to vacant lattice points of $X^-$ ions since they increase the efficiency of stimulated emission in the wavelength region of 600 to 700 nm. In that case, F often is in slight excess of X.

Although omitted from the formula (II), one or more additives such as bA, $wN^I$, $xN^{II}$ and $yN^{III}$ may be incorporated into the phosphor of the formula (II). A is a metal oxide such as $Al_2O_3$, $SiO_2$ or $ZrO_2$. In order to prevent $M^{II}FX$ particles from sintering, the metal oxide preferably has low reactivity with $M^{II}FX$, and the primary particles of the oxide are preferably super-fine particles of 0.1 μm or less diameter. $N^I$ is a compound of at least one alkali metal selected from the group consisting of Li, Na, K, Rb and Cs; $N^{II}$ is a compound of alkaline earth metal(s) Mg and/or Be; and $N^{III}$ is a compound of at least one trivalent metal selected from the group consisting of Al, Ga, In, Tl, Sc, Y, La, Gd and Lu. The metal compounds preferably are halides, but are not restricted to them.

b, w, x and y represent amounts of the additives incorporated into the starting materials, provided that the amount of $M^{II}FX$ is assumed to be one mol. They are numbers satisfying the conditions of $0 \leq b \leq 0.5$, $0 \leq w \leq 2$, $0 \leq x \leq 0.3$ and $0 \leq y \leq 0.3$. These numbers by no means represent the contents in the resultant phosphor because the additives possibly decrease during the steps of firing and washing performed thereafter. Some additives remain in the resultant phosphor as they are added to the materials, but the others react with $M^{II}FX$ or emigrates into the matrix.

In addition, the phosphor of the formula (II) may further contain Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoroborate compounds; hexafluoro compounds such as monovalent or divalent salts of hexa-fluorosilicic acid, hexafluorotitanic acid and hexa-fluorozirconic acid; or compounds of transition metals such as V, Cr, Mn, Fe, Co and Ni. The phosphor usable in the invention is not restricted to the above-mentioned phosphor, and any phosphors that can be essentially regarded as rare earth activated alkaline earth metal fluoride halide stimulable phosphors can be used.

It is still also preferred to use a rare earth activated alkaline earth metal sulfide stimulable phosphor represented by the following formula (III):

$M^{II}S:A,Sm$         (II)

in which $M^{II}$ is at least one alkaline earth metal selected from the group consisting of Mg, Ca and Sr; and A is preferably Eu and/or Ce.

Further, yet another preferred phosphor is a cerium activated trivalent metal oxide halide stimulable phosphor represented by the following formula (IV):

$M^{III}OX:Ce$         (IV)

in which $M^{III}$ is at least one rare earth element or trivalent metal selected from the group consisting of Pr, Nd, Pm, Sm, Eu, Tb, Dy, Ho, Er, Tm, Yb and Bi; and X is at least one halogen selected from the group consisting of Cl, Br and I.

In the case where the vapor-deposited layer is formed by multi-vapor deposition (co-deposition), at least two evaporation sources are used. One of the sources contains a matrix material of the energy storable phosphor, and the other contains an activator material. The multi-vapor deposition is preferred because the vaporization rate of each source can be independently controlled to incorporate the activator uniformly in the matrix even if the materials have very different melting points or vapor pressures. According to the composition of the desired phosphor, each evaporation source may consist of the matrix material or the activator material only or otherwise may be a mixture of the matrix material and additives. Three or more sources may be used. For example, in addition to the above sources, an evaporation source containing additives may be used.

The matrix material of the phosphor may be either the matrix compound itself or a mixture of two or more substances that react with each other to produce the matrix compound. The activator material generally is a compound containing an activating element, for example, a halide or oxide of the activating element.

If the activator is Eu, the Eu-containing compound of the activator material preferably contains Eu in a content of 70% or more by molar ratio because the desired stimulated emission (or instant emission) is emitted from the phosphor activated by $Eu^{2+}$ although the Eu-containing compound generally contains both $Eu^{2+}$ and $Eu^{3+}$. The Eu-containing compound is preferably represented by $EuX_m$ (X: halogen) in which m is a number preferably satisfying the condition of $2.0 \leq m \leq 2.3$. It is desired that the value of m should be 2.0. However, oxygen is liable to emigrate into the compound, if the value of m reaches 2.0. The compound is, therefore, practically stable when m is approximately 2.2.

The evaporation source preferably has a water content of not more than 0.5 wt. %. For preventing the source from bumping, it is particularly important to control the water content in the above low range if the material of matrix or activator is a hygroscopic substance such as EuBr or CsBr. The materials are preferably dried by heating at 100 to 300° C. under reduced pressure. Otherwise, the materials may be heated under dry atmosphere such as nitrogen gas atmosphere to melt at a temperature above the melting point for several minutes to several hours.

The evaporation source, particularly the source containing the matrix material, can contain impurities of alkali metal (alkali metals other than ones constituting the phosphor) preferably in a content of 10 ppm or less and impurities of alkaline earth metal (alkaline earth metals other than ones constituting the phosphor) preferably in a content of 5 ppm or less (by weight). That is particularly preferred if the phosphor is an alkali metal halide stimulable phosphor represented by the formula (I). Such preferred evaporation source can be prepared from materials containing little impurities.

The two or more evaporation sources and the substrate are placed in a vacuum evaporation-deposition apparatus. The apparatus is then evacuated to give a medium vacuum of 0.05 to 10 Pa. In order to narrow the luminescence width (d), a low degree of vacuum is preferred. The degree of vacuum preferably is in the range of 0.05 to 5 Pa. In addition, it is particularly preferred that, after the apparatus is evacuated to a high vacuum of $1 \times 10^{-5}$ to $1 \times 10^{-2}$ Pa, an inert gas such as Ar, Ne or $N_2$ gas be introduced into the apparatus so the inner pressure may be the medium vacuum. If this is desired, partial pressures of water and oxygen can be reduced. The apparatus can be evacuated by means of an optional combination of, for example, a rotary pump, a turbo molecular pump, a cryo pump, a diffusion pump and a mechanical buster.

For heating the evaporation sources, electric currents are then supplied to resistance heaters. The sources of matrix and activator materials are thus heated, vaporized, and reacted with each other to form the phosphor, which is deposited on the substrate. The space between the substrate and the sources depends upon various conditions such as the size of substrate, but generally is in the range of 10 to 1,000 mm. In order to narrow the luminescence width (d), a small space is preferred. The space, therefore, is preferably in the range of 50 to 500 mm. The space between the sources is generally in the range of 10 to 1,000 mm. In this step, the substrate may be heated or cooled. The temperature of the substrate generally is in the range of 20 to 350° C. In order to narrow the luminescence width (d), a low substrate temperature is preferred. The temperature, therefore, preferably is in the range of 20 to 250° C. The deposition rate, which means how fast the formed phosphor is deposited and accumulated on the substrate, can be controlled by adjusting the electric currents supplied to the heaters. The deposition rate generally is in the range of 0.1 to 1,000 μm/min., preferably in the range of 1 to 100 μm/min.

The heating with resistance heaters may be repeated twice or more to form two or more phosphor layers. After the deposition procedure is complete, the deposited layer may be subjected to heating treatment (annealing treatment), which is carried out generally at a temperature of 100 to 300° C. for 0.5 to 3 hours, preferably at a temperature of 150 to 250° C. for 0.5 to 2 hours, under inert gas atmosphere which may contain a small amount of oxygen gas or hydrogen gas.

Before preparing the above deposited film (layer) of stimulable phosphor, another deposited film (layer) consisting of the phosphor matrix alone may be beforehand formed. The layer of the phosphor matrix alone generally comprises agglomerate of columnar or spherical crystals, and the phosphor layer formed thereon is well crystallized in the form of columnar shape. The matrix alone-deposited layer also serves as a light-reflecting layer, and increase the amount of emission given off from the surface of the phosphor layer. In addition, if the matrix layer has a relative density in the range of 80 to 98%, it further serves as a stress-relaxing layer to enhance the adhesion between the support and the phosphor layer. In the thus-formed layers, the additives such as the activator contained in the phosphor-deposited layer are often diffused into the matrix alone-deposited layer while they are heated during the deposition and/or during the heating treatment performed after the deposition, and consequently the interface between the layers is not always apparent.

In the case where the phosphor layer is produced by mono-vapor deposition, only one evaporation source containing the above stimulable phosphor or a mixture of materials thereof is heated by means of a single resistance heater. The evaporation source is beforehand prepared so that it may contain the activator in a desired amount. Otherwise, in consideration of the gap of vapor pressure between the matrix components and the activator, the deposition procedure may be carried out while the matrix components are being supplied to the evaporation source.

Thus produced phosphor layer consists of a stimulable phosphor in the form of columnar crystals grown almost in the thickness direction. The phosphor layer contains no binder and consists of the stimulable phosphor only, and there are cracks among the columnar crystals. The thickness of the phosphor layer depends on, for example, aimed characters of the panel, conditions and process of the deposition, but generally is in the range of 50 μm to 1 mm, preferably in the range of 200 to 700 μm.

Generally, the narrower luminescence width (d) can be obtained if the phosphor layer has a smaller thickness and a lower density. Accordingly, the phosphor layer giving a narrow luminescence width can be prepared by, for example, lowering the temperature of substrate in deposition, reducing the degree of vacuum (increasing the pressure of introduced inert gas) in the apparatus, or reducing the space between the evaporation source and the substrate. The phosphor layer of the radiation image storage panel of the invention preferably has a thickness in the range of 130 to 800 μm. The packing ratio of the phosphor layer preferably is in the range of 80 to 90%. The density of the phosphor layer preferably is in the range of 3.6 to 4.0 g/cm$^3$.

The gas phase-accumulation method employable in the invention is not restricted to the above-described resistance heating process, and various other known processes such as an electron beam-application process, a sputtering process and a CVD process can be used.

It is not necessary that a substrate on which the phosphor layer is deposited is the same as a support of the radiation image storage panel. For example, after formed on the substrate, the deposited phosphor film is peeled from the substrate and then laminated on a support with an adhesive to prepare the phosphor layer. Otherwise, the support (substrate) may be omitted.

It is preferred to provide a protective layer on the surface of the phosphor layer, so as to ensure good handling of the storage panel in transportation and to avoid deterioration. The protective layer preferably is transparent so as not to prevent the stimulating light from coming in or not to prevent the emission from coming out. Further, for protecting the storage panel from chemical deterioration and physical damage, the protective layer preferably is chemically stable, physically strong, and of high moisture proof.

The protective layer can be provided by coating the stimulable phosphor layer with a solution in which an organic polymer such as cellulose derivatives, polymethyl methacrylate or fluororesins soluble in organic solvents is dissolved in a solvent, by placing a beforehand prepared sheet for the protective layer (e.g., a film of organic polymer such as polyethylene terephthalate, a transparent glass plate) on the phosphor layer with an adhesive, or by depositing vapor of inorganic compounds on the phosphor layer. Various additives may be dispersed in the protective layer. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective layer generally is in the range of about 0.1 to 20 μm if the layer is made of polymer material or in the range of about 100 to 1,000 μm if the layer is made of inorganic material such as glassy material.

For enhancing the resistance to stain, a fluororesin layer may be further provided on the protective layer. The fluororesin layer can be form by coating the surface of the protective layer with a solution in which a fluororesin is dissolved (or dispersed) in an organic solvent, and drying the coated solution. The fluororesin may be used singly, but a mixture of the fluororesin and a film-forming resin is generally employed. In the mixture, an oligomer having polysiloxane structure or perfluoroalkyl group can be further incorporated. In the fluororesin layer, fine particle filler may be incorporated to reduce blotches caused by interference and to improve the quality of the resultant image. The thickness of the fluororesin layer generally is in the range of 0.5 to 20 μm. For forming the fluororesin layer, additives such as a crosslinking agent, a film-hardening agent and an anti-yellowing agent can be used. In particular, the crosslinking agent is advantageously employed to improve durability of the fluororesin layer.

Thus, a radiation image storage panel of the invention can be produced. The radiation image storage panel of the invention may be in known various structures. For example, in order to improve the sharpness of the resultant image, at least one of the constitutional films (or layers) may be colored with a colorant which does not absorb the stimulated emission but the stimulating light.

Below, the process of the invention for read-out of radiation image information is explained in detail with reference to the attached drawings.

Figure 5:
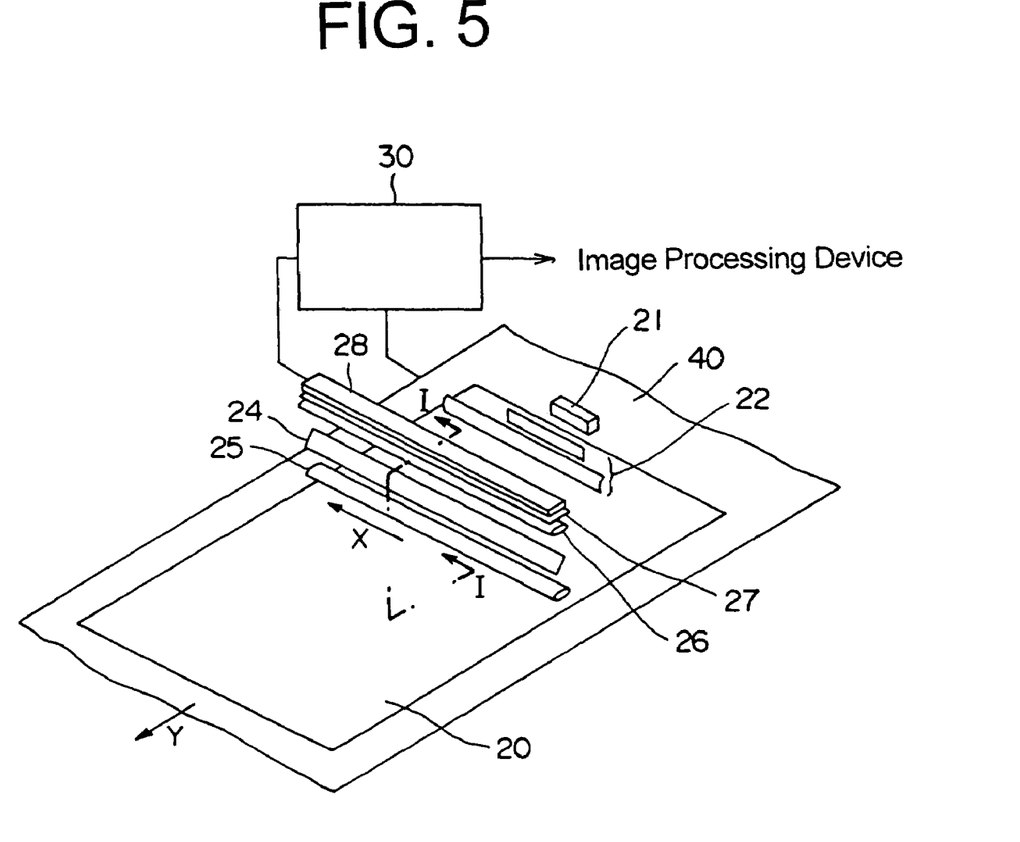
FIG. 5 illustrates a sketch showing an example of the radiation image information-reading apparatus for performing the process of the invention.

FIG. 5 is a sketch showing a radiation image information-reading apparatus for performing the process of the invention.

Figure 6:
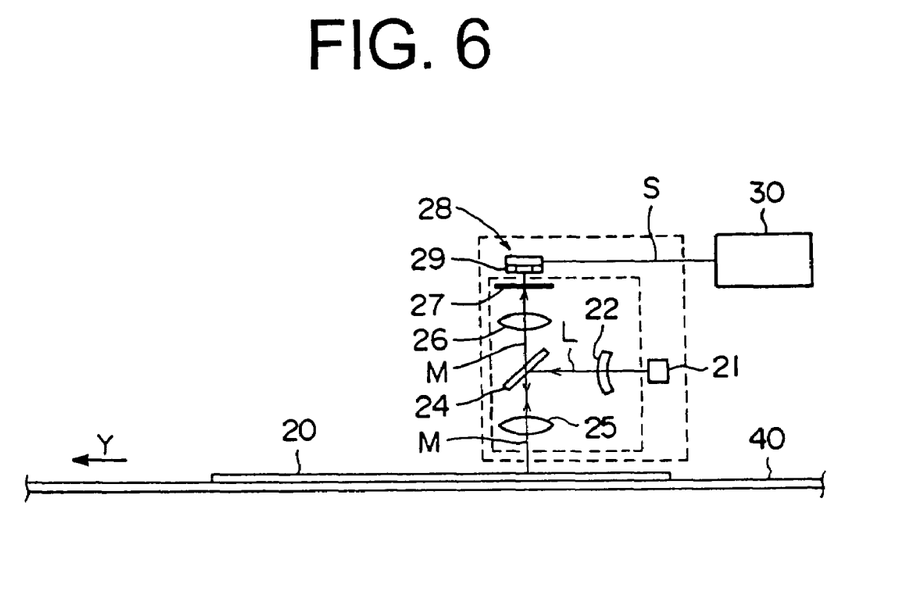
FIG. 6 is a sectional view of the apparatus shown in FIG. 5 sectioned with I—I line.

FIG. 6 is a sectional view of the apparatus shown in FIG. 5 sectioned with I—I line.

Figure 7:
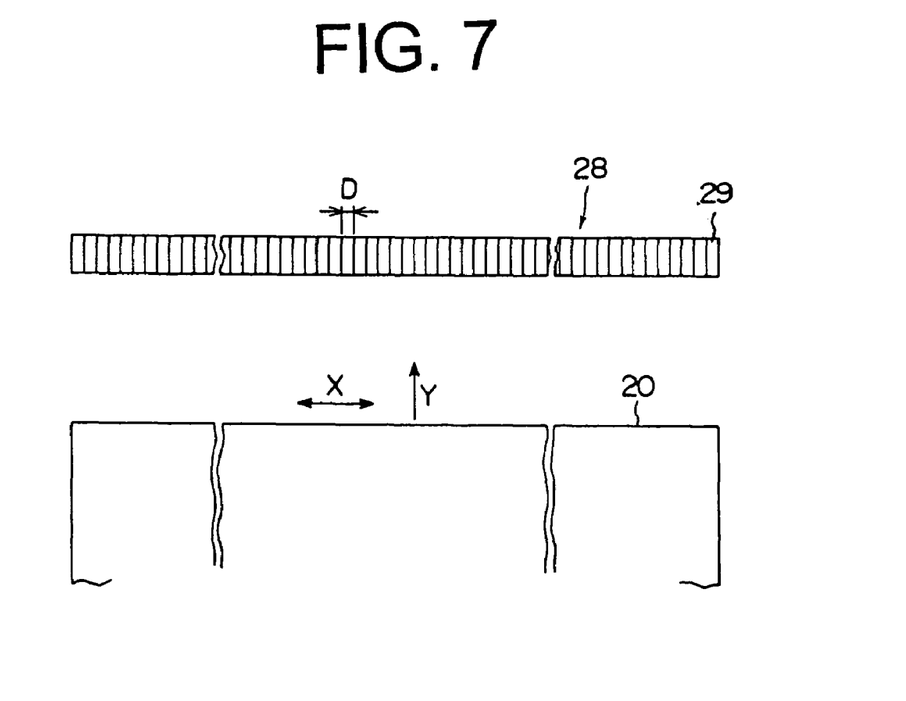
FIG. 7 is a detailed illustration of the line-sensor 28.

FIG. 7 schematically illustrates the line-sensor 28 in detail.

The radiation image storage panel 20 in FIGS. 5 and 6 comprises a support and an energy storable phosphor layer formed on the support by a gas phase-accumulation method, and it can gives off stimulated emission having a luminescence width (d) of 150 to 395 µm. The storage panel 20 is beforehand exposed to radiation (such as X-rays) having passed through an object, and hence radiation image of the object is recorded and stored in the storage panel 20. The storage panel 20 is put on the transferring belt 40 so that the phosphor layer-side may be upside. The transferring belt 40 moves in the direction shown by an arrow Y, and thereby the storage panel 20 is transferred in that direction. The transferring rate of the storage panel 20 is identical with the moving rate of the belt 40, which is beforehand input into an image-reading means 30.

A broad area laser (hereinafter often referred to as BLD) 21 linearly gives off stimulating light L almost parallel to the surface of the panel 20. The stimulating light L is focused through a cylindrical lens 22, and reflected by a dichroic mirror 24 placed at an angle of 45° to the storage panel 20. The light reflected by the mirror 44 then advances perpendicularly to the storage panel 20, and passes through a distributed index lens array (an array of many distributed index lenses, hereinafter referred to as "first SELFOC lens array") 25 to be focused on the storage panel 20 linearly in the direction shown by an arrow X. The storage panel 20 is thus exposed to the stimulating light L in a linear area whose width (namely, the width of the laser beam) generally is in the range of 10 to 200 µm. The length of the area is preferably longer than or the same as the width of the storage panel 20.

The linearly focused stimulating light L is perpendicularly applied to the storage panel 20, and thereby a stimulated emission M is emitted from an area enclosing the applied area and neighbor thereof. The emission M has an intensity according to the stored radiation image information. The stimulated emission M is converted into parallel light through the first SELFOC lens array 25, and passes through the dichroic mirror 24. The emitted light M then passes through a second SELFOC lens array 26, to be focused on light-receiving faces of photoelectric converting elements 29 constituting a line sensor 28 placed just above the area on which the stimulating light is focused. In this way, an image on the storage panel 20 is isometrically focused on the elements 29.

As shown in FIG. 7, the line sensor 28 comprises many (for example, 1,000 or more) photoelectric converting elements 29 regularly aligned in the direction X. Examples of the photoelectric converting element 29 include an amorphous silicon sensor, a CCD sensor, a CCD with back illuminator and MOS image sensor. Each converting element one-to-one corresponds to each pixel, and has a light-receiving face of, for example, 200 µm×200 µm in size.

In the present invention, for ensuring the resultant image quality, the pixel satisfies the conditions of $25 \leq D \leq 400$ and $0.5 \leq d/D \leq 4$ where D stands for the pixel size (µm) in the direction X (primary direction of scanning).

In the line sensor 28 of FIG. 7, the pixel size D corresponds to an X-directional size of the light-receiving face in each photoelectric converting element 29. The line sensor 28 has the converting element 29 satisfying the above conditions. Also in the direction Y (secondary direction of scanning), each pixel (namely, light-receiving face in each element 29) preferably has a size (µm) satisfying the above-mentioned conditions.

Since the line sensor 28 is placed right above the area on which the stimulating light L is focused, the stimulated emission coming almost perpendicularly can be efficiently collected. That is particularly remarkable because the converting elements 29 have small light-receiving faces.

The stimulated emission M having passed through the second SELFOC lens array 26 is slightly contaminated with the stimulating light L reflected by the surface of the panel 20, and hence the contaminating light L is cut off by means of a stimulating light-cutting filter 27. The filter 27 does not transmit the stimulating light L but the stimulated emission M.

The stimulated emission M received by each converting element 29 is photoelectrically converted into signals S, which are then sent to the image-reading means 30. In the image-reading means 20, the signals S are processed on the basis of the moving speed of the transferring belt 40 to obtain image data according to the position of the storage panel 20. Thus obtained image data are supplied into an image-processing apparatus (not shown).

The radiation image information-reading apparatus used in the invention is not restricted to the embodiment shown in FIGS. 5 to 7. Each part of the apparatus (such as the light source, the light-collecting optical system between the light source and the storage panel, the optical system between the storage panel and the line sensor, and the line sensor) may have various known constitution.

The line sensor may consist of two or three rows of photoelectric converting elements, as well as the above-described single row of the elements. Further, according to the desired pixel size and the size of light-receiving face in each element, two or more elements may correspond to one pixel.

As the line light source, a light source itself having a linear shape may be used. Further, a fluorescent lamp, a cold cathode fluorescent lamp and a LED (light-emitting diode) array can be also used. The line light source may give off the stimulating lights either continuously or intermittently in the form of pulses. In consideration of lowering noises, the stimulating lights are preferably in the form of pulses with high power.

The radiation image storage panel is preferably transferred almost perpendicularly to the longitudinal direction of the line light source and the line sensor. However, as long as almost all of the surface of the panel is evenly exposed to the stimulating lights, the panel may be transferred diagonally or in a zigzag.

In the above embodiment, the optical path of the stimulating lights L and that of the stimulated emission M are partly overlapped to downsize the apparatus. However, the path of the stimulating lights L may be completely different from that of the emission M.

Further, in the above embodiment, the radiation image information is read out while the storage panel is being transferred. However, the information may be read out while not the panel but the line light source and the line sensor are being moved parallel to the surface of the panel. If the panel has a transparent support, another line sensor may be placed on the bottom side in addition to the line sensor on the top side so that the emission can be detected from both top and bottom of the panel. Otherwise in that case, the emission may be observed only from the bottom.

In the above reading system, an image-processing apparatus, in which image data signals sent from the radiation image information-reading apparatus are subjected to various signal processing, may be installed. Further, an erasing means, in which radiation energy remaining in the panel after reading is adequately released, may be combined.

EXAMPLE 1

(1) Evaporation Source

As the evaporation sources, powdery cesium bromide (CsBr, purity: 4N or more) and powdery europium bromide ($EuBr_m$, m is approx. 2.2, purity: 3N or more) were prepared. Each of them was analyzed according to ICP-MS method (Inductively Coupled Plasma Mass Spectrometry), to find impurities. As a result, the CsBr powder contained each of the alkali metals (Li, Na, K, Rb) other than Cs in an amount of 10 ppm or less and other elements such as alkaline earth metals (Mg, Ca, Sr, Ba) in amounts of 2 ppm or less. The $EuBr_m$ powder contained each of the rare earth elements other than Eu in an amount of 20 ppm or less and other elements in amounts of 10 ppm or less. The powders are very hygroscopic, and hence were stored in a desiccator keeping a dry condition whose dew point was −20° C. or below. Immediately before used, they were taken out of the desiccator.

(2) Preparation of Phosphor Layer

A synthetic quartz substrate as a support was washed successively with an aqueous alkaline solution, purified water and IPA (isopropyl alcohol). The thus-treated substrate was mounted to a substrate holder in an evaporation-deposition apparatus. Each of the CsBr and $EuBr_m$ evaporation sources was placed in a crucible. The apparatus was evacuated to make the inner pressure $1 \times 10^{-3}$ Pa by means a combination of a rotary pump, mechanical booster and turbo molecular pump, and then Ar gas (purity: 5N) was introduced to set the inner pressure at 0.8 Pa (Ar gas pressure). The distance between the substrate and each source was 200 mm. The substrate was then heated to 100° C. by means of a sheath heater placed on the back side (the opposite side to the face which the vapor is to be deposited on). Each evaporation source was also heated with a resistance heater, so that CsBr:Eu stimulable phosphor was accumulated on the surface of the substrate at a deposition rate of 10 μm/min. for 15 minute. During the deposition, the electric currents supplied to the heaters were controlled so that the molar ratio of Eu/Cs in the stimulable phosphor might be 0.003/1. Each source was first covered with a shutter, which was then opened to start the evaporation of CsBr or EuBr. After the evaporation-deposition was complete, the inner pressure was returned to atmospheric pressure and then the substrate was taken out of the apparatus. On the substrate, a deposited layer (thickness: approx. 200 μm, area: 10 cm×10 cm) consisting of columnar phosphor crystals aligned densely and almost perpendicularly was formed. Thus, a radiation image storage panel of the invention comprising the support and the phosphor layer was produced by multi-vapor deposition.

EXAMPLES 2 TO 7

The procedures of Example 1 were repeated except that the period for deposition in Example 1 (2) was change as set forth in Table, to prepare radiation image storage panels having a phosphor layer having different thickness.

EXAMPLE 8

The procedures of Example 1 were repeated except that the Ar gas pressure was set to 0.5 Pa, the substrate temperature was set to 30° C., and the deposition period was set to 45 min., to give a radiation image storage panel having a thickness differing from that of the storage panel of Example 1.

EXAMPLE 9

The procedures of Example 1 were repeated except that the Ar gas pressure was set to 0.5 Pa, the substrate temperature was set to 60° C., and the deposition period was set to 60 min., to give a radiation image storage panel having a thickness and a density differing from those of the storage panel of Example 1.

EXAMPLE 10

The procedures of Example 1 were repeated except that the Ar gas pressure was set to 1 Pa, the substrate temperature was set to 60° C., and the deposition period was set to 50 min., to give a radiation image storage panel having a thickness and a density differing from those of the storage panel of Example 1.

COMPARISON EXAMPLES 1 AND 2

The procedures of Example 1 were repeated except that, the time for deposition in Example 1 (2) was changed as set forth in Table 1, to give a radiation image storage panel having a thickness differing from that of the storage panel of Example 1.

COMPARISON EXAMPLE 3

The procedures of Example 1 were repeated except that the Ar gas pressure was set to 0.5 Pa and the deposition period was set to 30 min., to give a radiation image storage panel having a thickness and a density differing from those of the storage panel of Example 1.

COMPARISON EXAMPLE 4

The procedures of Example 1 were repeated except that the Ar gas pressure was set to $1 \times 10^{-3}$ Pa and the deposition period was set to 50 min., to give a radiation image storage panel having a thickness and a density differing from those of the storage panel of Example 1.

COMPARISON EXAMPLE 5

The procedures of Example 1 were repeated except that the Ar gas pressure was set to 2 Pa, the substrate temperature was set to 30° C., and the deposition period was set to 60 min., to give a radiation image storage panel having a thickness and a density differing from those of the storage panel of Example 1.

EVALUATION OF RADIATION IMAGE STORAGE PANEL

With respect to each produced radiation image storage panel, the density and the packing degree of the phosphor layer were measured and then the luminescence width (d) was determined in the above-described manner. In addition, the sensitivity and the sharpness given by each panel were evaluated in the following manner.

(1) Sensitivity

Each radiation image storage panel was encased in a room light-shielding cassette and then exposed to X-rays (voltage: 80 kvp, current: 16 mA). After the storage panel was taken out of the cassette, the stimulated emission was released and detected by means of the aforementioned reading apparatus shown in FIGS. 5 to 7 [stimulating lights: broad area laser beam, width of beam (half-width of stimulating light): 50 µm, size of CCD light-receiving face=pixel size D: approx. 200 µm], to measure the amount of the stimulated emission. On the basis of the obtained amount (relative value) of stimulated emission, the sensitivity of the panel was estimated.

(2) Sharpness (MTF)

Each radiation image storage panel was exposed through a CTF chart to the above X-rays, and then the image data was obtained in the same manner as described above. The obtained image data was processed by an image reproducing apparatus into an image film, from which intensity at each spatial frequency was measured to determine a modulation transfer function (MTF) at the spatial frequency of 1 c/mm.

The results are shown in Table 1.

TABLE 1

| Ex. | (1) | (2) | (3) | (4) | (5) | (6) | (7) | (8) | (9) |
|---|---|---|---|---|---|---|---|---|---|
| Ex. 1 | 0.8 | 100 | 15 | 150 | 3.8 | 85.8 | 155 | 17 | 0.87 |
| Ex. 2 | 0.8 | 100 | 20 | 200 | 3.8 | 85.8 | 183 | 19 | 0.86 |
| Ex. 3 | 0.8 | 100 | 35 | 355 | 3.8 | 85.8 | 216 | 28 | 0.81 |
| Ex. 4 | 0.8 | 100 | 50 | 530 | 3.8 | 85.8 | 304 | 30 | 0.66 |
| Ex. 5 | 0.8 | 100 | 60 | 611 | 3.8 | 85.8 | 297 | 35 | 0.67 |
| Ex. 6 | 0.8 | 100 | 65 | 650 | 3.8 | 85.8 | 304 | 37 | 0.66 |
| Ex. 7 | 0.8 | 100 | 75 | 770 | 3.8 | 85.8 | 318 | 42 | 0.63 |
| Ex. 8 | 0.5 | 30 | 45 | 466 | 3.8 | 85.8 | 338 | 50 | 0.60 |
| Ex. 9 | 0.5 | 60 | 60 | 600 | 3.9 | 88.0 | 358 | 45 | 0.59 |
| Ex. 10 | 1 | 60 | 50 | 511 | 3.7 | 83.5 | 296 | 40 | 0.65 |
| Con1 | 0.8 | 100 | 5 | 50 | 3.8 | 85.8 | 80 | 11 | 0.97 |
| Con2 | 0.8 | 100 | 10 | 100 | 3.8 | 85.8 | 135 | 13 | 0.92 |
| Con3 | 0.5 | 100 | 60 | 600 | 4.1 | 92.6 | 500 | 22 | 0.32 |
| Con2 | 1 × 10$^{-3}$ | 100 | 50 | 500 | 4.4 | 99.3 | 865 | 11 | 0.03 |
| Con3 | 2 | 30 | 60 | 586 | 3.4 | 76.7 | 400 | 30 | 0.49 |

Remarks:
(1) Ar gas pressure (Pa)
(2) Temperature (° C.) of substrate
(3) Period (min.) of deposition
(4) Thickness (µm) of deposited phosphor layer
(5) Density (g/cm$^3$) of deposited phosphor layer
(6) Packing ratio (%) of deposited phosphor layer
(7) Luminescence width d (µm)
(8) Sensitivity (relative value)
(9) Sharpness The results shown in Table 1 indicate that the radiation image storage panels of the invention (Examples 1 to 10, total evaluation: good), each of which gives off the stimulated emission with a luminescence width (d) of 150 to 395 µm (particularly, 150 to 380 µm), have much higher sensitivities and give reproduced images of higher sharpness than a radiation image storage panel for comparison (Comparison Example 4, total evaluation: bad) giving off the emission with a large luminescence width.

It is also evident from the results that the storage panels of the invention have higher sensitivity and give higher sharpness than other radiation image storage panels for comparison (Comparison Example 1 and 2, total evaluation: bad), each of which gives a narrow luminescence width of less than 150 µm or than still another panel for comparison (Comparison Examples 3 and 5, total evaluation: bad) giving a luminescence width as large as 500 µm.

What is claimed is:

1. A radiation image storage panel comprising an energy storable phosphor layer formed by a gas phase-accumulation method, wherein the energy storable phosphor layer gives off an emission having a luminescence width d in the range of 150 to 395 µm when it is exposed to radiation and then excited with a stimulating light of 50 µm half-width, where d represents the range of the resulting emission profile at half maximum.

2. The radiation image storage panel of claim 1, wherein the luminescence width d is in the range of 290 to 380 µm.

3. The radiation image storage panel of claim 1, wherein the energy storable phosphor has a packing ratio in the range of 80 to 90% and a thickness in the range of 130 to 800 µm.

4. The radiation image storage panel of claim 1, wherein the energy storable phosphor layer comprises a stimulable alkali metal halide phosphor represented by the formula (I):

$$M^I X . a M^{II} X'_2 . b M^{III} X''_3 : zA \qquad (I)$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" independently is at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Cu, Ag, Tl and Bi; and a, b and z are numbers satisfying the conditions of $0 \leq a < 0.5$, $0 \leq b < 0.5$ and $0 < z < 1.0$, respectively.

5. The radiation image storage panel of claim 4, wherein $M^I$ is Cs, X is Br, A is Eu, and z is a number satisfying the condition of $1 \times 10^{-4} \leq z \leq 0.1$.

6. The radiation image storage panel of claim 5, wherein the energy storable phosphor layer has a density in the range of 3.6 to 4.0 g/cm$^3$ and a thickness in the range of 130 to 800 µm.

7. A process for reading out a radiation image stored in a radiation image storage panel which comprises the steps of:
moving a radiation image storage panel of claim 1 in which the radiation image is stored, relatively to a set of a stimulating means and a light-detecting means in which the stimulating means applies to one surface of the storage panel a stimulating light extended linearly in a width direction of the storage panel and in which the light-detecting means is equipped with an isometric erect image-forming means and comprises a plurality of photoelectrically converting pixels aligned in the width direction of the storage panel, each of the pixels having a size D under such conditions that 25 $\mu m \leq D \leq 400$ $\mu m$ and $0.5 \leq d/D \leq 4$ in the width direction of the storage panel;

applying the stimulating light to one surface of the storage panel linearly in the width direction of the storage panel and detecting a stimulated emission given off by the storage panel by the light-detecting means through the equivalent erect image-forming means to produce a series of electric signals; and processing the electric signals in relation to an information of the relative movement between the storage panel and the set of a stimulating means and a light-detecting means, to obtain a reproduced radiation image in the form of a series of electric image signals.

8. The process of claim 7, wherein the light-detecting means is a line sensor which comprises plural photoelectric converting elements arranged linearly.

9. The process of claim 8, wherein each photoelectric converting element corresponds to each pixel of the light-detecting means.

* * * * *